US008676737B2

(12) United States Patent
Junker

(10) Patent No.: US 8,676,737 B2
(45) Date of Patent: Mar. 18, 2014

(54) DETECTING MISSING CASES IN BUSINESS RULES

(75) Inventor: Ulrich Junker, Biot (FR)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 12/898,359

(22) Filed: Oct. 5, 2010

(65) Prior Publication Data

US 2011/0082826 A1 Apr. 7, 2011

(51) Int. Cl.
*G06F 5/00* (2006.01)
*G06N 5/02* (2006.01)

(52) U.S. Cl.
USPC .......................................................... 706/47

(58) Field of Classification Search
None
See application file for complete search history.

(56) References Cited

U.S. PATENT DOCUMENTS

2004/0034848 A1* 2/2004 Moore et al. ................. 717/117

OTHER PUBLICATIONS

L'E-Lyee: coupling L'Ecritoire and LyeeALL, Rolland C.,Information and Software Technology, vol. 44, No. 3, Mar. 15, 2002, pp. 185-194(10), Feb. 12, 2002.*
Working with Decision Tables, Oracle® Fusion Middleware User's Guide for Oracle Business Rules.

* cited by examiner

*Primary Examiner* — Kakali Chaki
*Assistant Examiner* — Daniel Pellett
(74) *Attorney, Agent, or Firm* — DeLizio Gilliam, PLLC

(57) ABSTRACT

A missing case of a fixed scope can be detected among a plurality of business rules of unrestricted forms. According to one or more embodiments, the described detecting includes building a rules inhibition graph for the plurality of business rules representing a constraint model comprising a plurality of nodes and describing a plurality of cases which make the plurality of business rules non-applicable; labeling the rules inhibition graph with values satisfying constraints of the constraint model by search and inference, and determining a missing case when a consistent labeling satisfying the constraints of the constraint model is obtained. Using one or more of the described embodiments missing cases which may result from unforeseen interactions of overlapping tests over an a priori unknown number of attributes among arbitrary business rules may be detected.

2 Claims, 15 Drawing Sheets

DETECTING MISSING CASES IN BUSINESS RULES

TECHNICAL FIELD

Embodiments of the present invention relate generally to data processing, and more particularly to systems and methods for managing business rules.

DESCRIPTION OF RELATED ART

Business rules make decisions depending on given cases. A case usually consists of a combination of features and a decision may be a combination of elementary choices. A business rule makes a decision by applying an action to a given case. A business rule cannot handle all cases, but only those that satisfy a condition. A business rule thus consists of a condition, which usually is a combination of tests, and an action, which may consist of a sequence of elementary steps. As a business rule treats only certain cases, it defines only a part of the whole decision making process. Further business rules are needed to make a decision for the remaining cases. If the given business rules are making a decision for each relevant case, then such a collection of rules is complete. Otherwise, there are missing cases, i.e. cases that do not satisfy the condition of any rule. As a consequence, the given rules will make no decision for the missing cases. Due to the combinatorial nature of the conditions, unforeseen missing cases easily arise even for small numbers of business rules.

Existing systems for missing-case detection do not provide a general method which detects missing cases for arbitrary business rule projects whether these rules are uniform or diverse and have simple or complex conditions. More general rule projects require non-trivial descriptions of missing rules and non-trivial methods for finding them.

One technique involves the use of simple tree-like enumeration of tuples in a discrete space. The described technique is insufficient to find missing rules that result from unforeseen interactions between complex tests that may overlap or concern multiple attributes of an unknown number of objects.

An alternative technique may be given by trial-and-error methods. Whereas those methods may by chance find some specific missing cases, they are insufficient to explore the missing cases in a systematic way and to give guarantees about the results.

Some existing systems consider a single conjunction of conditions at a time. When searching missing cases for business rules, such approaches correspond to analyzing a single rule at a time and to searching the cases that are not handled by this rule. It may be possible that some proposals are partly or entirely handled by other business rules. Moreover, a business rule has a scope, i.e. it matches objects of certain types. It may have multiple instantiations with respect to the given configuration of objects. If a rule is non-applicable, then each of its instantiations must be non-applicable, which requires a sophisticated logical description of the missing-case detection problem in terms of universally quantified formulas. Those issues do not arise for the problem of finding alternatives to a single scenario. As a consequence, the difficulty described by such existing systems is significantly simpler than that of finding missing cases of business rules.

Some existing systems raise the issue of completeness. Enactment rules may guide users in discovering goals and in authoring scenarios. There are particular rules for analyzing the completeness and the consistency of scenarios. Those enactment rules may describe initiating a completeness analysis, but no more. Active participation of users in such systems is required. Such existing systems do not discuss the completeness analysis of rulesets. The described systems do not guarantee that the proposed missing case descriptions correspond to any case.

Existing methods are insufficient to detect the missing cases of arbitrary business rules which result from unforeseen interactions of overlapping tests over an a priori unknown number of attributes.

SUMMARY

An embodiment of the invention leverages highly advanced modeling and problem solving methods as elaborate in the areas of constraint programming, propositional satisfiability. and automated theorem proving. The foundation is a constraint model that describes the cases in which no rule is applicable in a compact form. If the rules of the rule project are organized into rule tasks, then the model takes this organization into account and determines for each task whether there are incomplete cases among the rules of the tasks. The constraint model describes the missing cases in a most natural form and uses advanced mathematical and logical modeling features to achieve this goal. This includes universally quantified constraints to describe that a rule is not applicable whatever object exists, equality theory for reasoning about objects, and arithmetic's and other algebras to reason about the feasibility of tests involving arithmetic and other algebraic operation.

An embodiment of the invention combines the construction of a constraint model for a given rule set with instrumentation of existing solvers. in order to synthesize missing cases from the solutions obtained by constraint solvers. A feature of one embodiment of the invention consists in a graphical representation of the constraint model which guarantees uniqueness of representation of sub-formulas and sub-expressions and thus an effective sharing of information during the solving process. As the constraint model makes use of advanced modeling features, it is not solvable as such by existing constraint solvers. The missing-case detector includes constraint generation techniques to make it work with existing 'base solvers' such as Constraint Programming (CP) solvers. Propositional Satisfiability (SAT) solvers, Satisfiability Modulo Theories (SMT) solvers or Integer Programming (IP) solvers. These solvers are then able to find a single missing case. The missing case detector is rendered able to generalize this case and to derive a family of similar missing cases from it. The missing case detector also computes a missing-case nogood which characterizes all the cases that do not belong to the missing-case family.

In general, a "nogood" expresses that a given tuple of values is forbidden for a given tuple of variables. For the specific case of a missing case nogood, a given tuple of truth values is forbidden for a given tuple of constraint nodes.

In subsequent calls, the missing-case detector will compute new families of missing cases if it receives feed-back from previously computed nogoods. The missing-case detector is thus able to compute multiple families of non-overlapping missing-cases as well as a representative missing case for each of the families. The missing-case detector can produce a full report or compute the missing cases and their families one by one in an iterative mode.

The missing-case detector is thus able to perform a systematic and effective exploration of the missing cases for a given scope and unrestricted forms of rule projects. Not only does it recognize simple kinds of missing cases which can be described as rectangular blocks in a fixed Cartesian space, but also complex forms of missing cases involving a constellation of interrelated multiple objects from different spaces. The missing-case detector produces concise descriptions of the missing cases occurring in those projects or returns a notification that the project is complete.

An embodiment as described herein provides a guarantee that the missing case. descriptions correspond to true cases and are not inconsistent combinations of requirements about those cases. The described computer program product (or system) embodiments are therefore convenient to analyze rule sets containing more than one rule. One or more embodiments described herein also provide the ability to be able to reason about instantiations of rules. Embodiments also provide the ability to detect the missing cases of arbitrary business rules and not only a limited form of business rules. Missing cases among arbitrary business rules may result from unforeseen interactions of overlapping tests over an a priori unknown number of attributes.

BRIEF DESCRIPTION OF THE SEVERAL VIEWS OF THE DRAWINGS

Embodiments of the invention will now be described with reference to the following drawings, in which.

Figure 1:
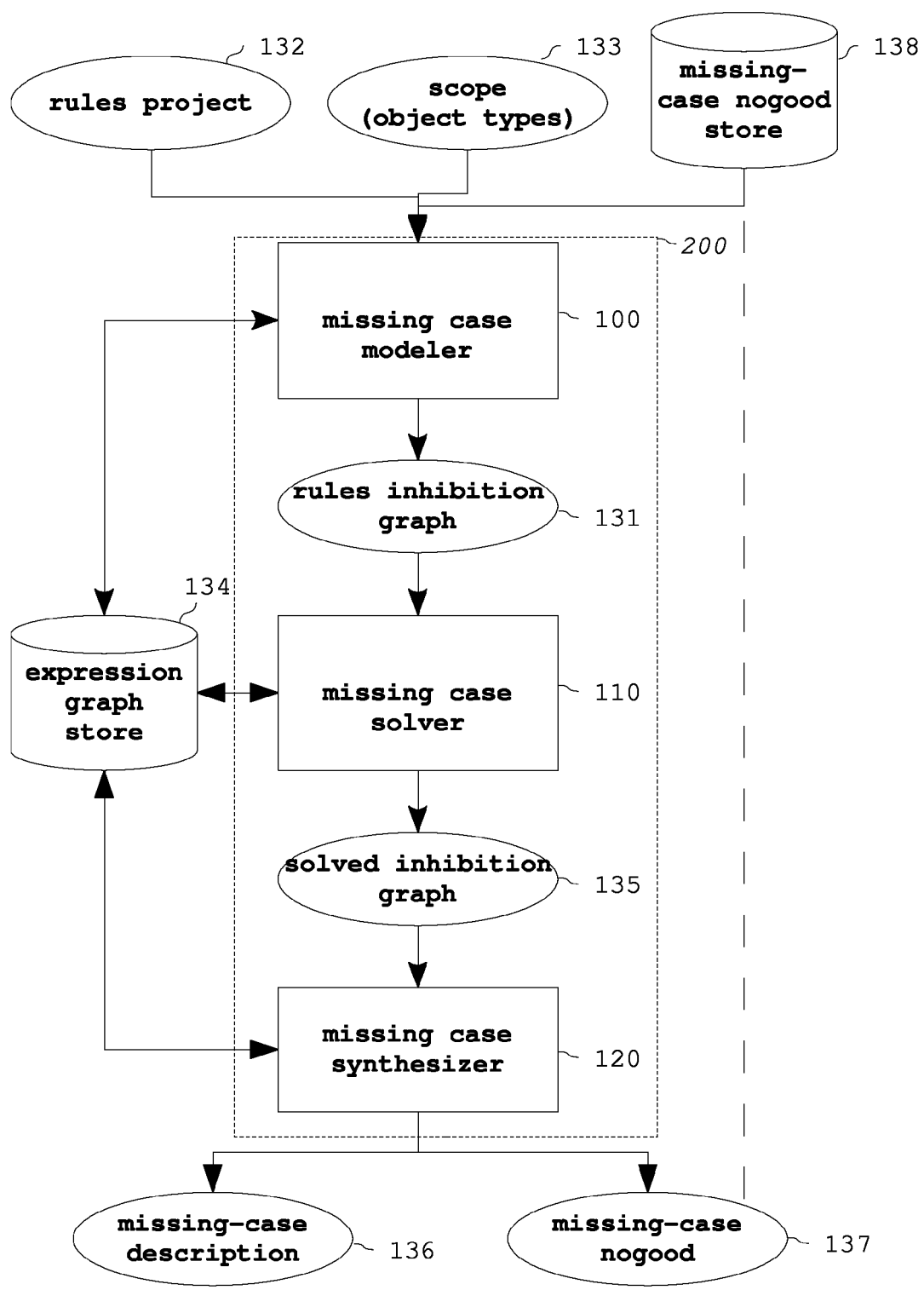
FIG. 1 shows a data-flow chart of a missing-case detector.

To facilitate description, any numeral identifying an element or elements in one figure will represent the same or similar element(s) in any other figure.

DETAILED DESCRIPTION

The following description in made with reference to business rules context for illustrative purposes. However, the invention is not limited to this specific context or type of content and can be extended to other type of rules and/or contexts (such as semantics and semantic web technologies, knowledge management, business logic, project management, database management, information management, web services, SOA service oriented architecture, reengineering, artificial intelligence, expert systems, machine learning, etc).

The flowchart and block diagrams in the Figures herein illustrate the architecture, functionality, and operation of possible implementations of systems, methods and computer program products according to various embodiments of the present invention. In this regard, each block in the flowchart or block diagrams may represent a Module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Business rule management systems (BRMS) are computerized systems for authoring, managing, and deploying business rules. A BRMS offers a formal rule language for representing the business rules and groups the represented business rules together within rule projects. A business rule project is complete if its rules treat all relevant cases, but contains missing cases otherwise. Missing cases arise naturally in intermediate steps during rule authoring when a rule author adds one rule after the other to a rule project. Moreover, they may also arise in finished rule projects due to the combinatorial nature of rule conditions. In both cases, the rule author needs knowledge about the missing cases in order to provide supplementary rules. In spite of these needs, the automatic detection of missing cases does not belong to the standard functionality of a BRMS. Business Rule Management Systems differ in the kind of business rules that they process and offer rather different rule representation languages. In the most general and also the most common case, a BRMS supports production rules which match objects in a working memory and which modify the matched objects when being executed. The BRMS uses an object model that declares the types and attributes of the objects and the relations among them. The condition of a production rule consists of a scope describing the types of the matched objects and a list of tests on attributes and method invocations of the matched objects as well as other objects that can be accessed from the matched objects via given paths of relations in the object model. The tests can also involve arithmetic and other algebraic operations among attributes of appropriate type. Examples are "the credit of the customer minus the debts of the customer is greater than 1000" or "the manager of the manager of the manager of the employee has accepted the purchase request of the employee". The second example illustrates that object paths may be of an a priori unbounded length. The production rule matches a set of objects in the working memory if the types of the objects comply with its scope and the objects are satisfying its tests. It is noteworthy that different production rules may have different scopes, which leads to a "many-object many-pattern pattern matching problem" as described in Charles Forgy, *Rete: A Fast Algorithm for the Many Pattern/Many Object Pattern Match Problem, Artificial Intelligence,* 19, pp 17-37, 1982. Hence a BRMS in its general form is capable of managing and processing rule projects containing highly diverse rules.

Some existing BRMS systems offer restricted business rule languages, thus simplifying the rule management and execution tasks while compromising on other requirements. Typical restrictions concern the number and form of scopes and tests. Not only do these restrictions simplify tasks like rule authoring, rule management, and rule execution, but they also impact the form, size, and number of the missing cases. A first restriction ensures that all rules have the same scope, i.e. are matching objects of the same types. This restriction simplifies the many-object many-pattern pattern matching problem. A second restriction ensures that all tests are flat, i.e. only concern attributes of matched objects and not objects accessed via paths. Both restrictions together impose an upper bound on the number of attributes that are occurring in the tests of the different rules. They allow a representation of the rules in a tabular form, i.e. a decision table. They further allow a description of the matching problem in terms of a well-defined Cartesian space. A configuration of matched objects is a point in the space and the rule condition covers some zone in the space describing valid matches. A third restriction imposes that all the rules contain only unary tests that concern a single attribute, but not multiple attributes. The three restrictions together ensure that a rule condition covers a rectangular block in the Cartesian space. Different combinations of the three restrictions lead to a classification of rule projects into different categories.

These categories impact the number and form of the cases and the difficulty and the result of a computer-implemented method for missing case detection. Projects of a category have a well-defined Cartesian space and the rule conditions cover well-aligned rectangular blocks in this space. As the rectangular blocks are well-aligned, non-covered areas also have the form of rectangular blocks, which constitute families of missing cases. As these rectangular blocks may have strongly varying forms due to overlaps between the tests over some attribute, the computation of those missing blocks is a non-trivial task. For this reason, in some BRMS systems further simplifying assumptions have been introduced within a completeness analyzer, and rule authors are then asked to partition the domain of each attribute into a finite number of sub-domains. The unary tests then simply check whether an attribute belongs to one of the sub-domains. This simplifying assumption partitions each axis into a finite number of ranges and the whole space into a finite number of rectangular blocks. In this setting, a tree-like enumeration procedure is sufficient to determine the missing cases.

More general decision tables such as those provided by IBM WebSphere ILOG JRules 7.0 support tests that overlap, involve multiple attributes, and contain object paths. Each type in the scope defines a proper Cartesian space. A case corresponds to an object constellation, i.e. a labeled graph of objects from different spaces. The graph labels indicate the relations between the objects. These more complex forms of cases require different kinds of descriptions such as conjunctions of object-attribute-value triples. Furthermore, a conjunction of literals (i.e. test) are an adequate means to describe a family of related tests. Missing cases (families) for rule projects of categories 2, 3, 5, and 6 thus have an elegant characterization in terms of conjunctions of literals. This characterization works also for projects of categories 1 and 4, even if it is not the most intuitive form. A computerized method for computing missing cases of rule projects of category 2, 3, 5 and 6 therefore will produce a report that describes the families of missing cases in terms of conjunctions of literals. It will treat projects of categories 4 and 6 as well.

These above-mentioned categories permit a classification of mainstream BRMS which use a production rule language. Some Business Rule Systems do not support production rules, but logical inference' rules or default rules [See: IBM CommonRules). Those rules work on objects representing facts. When executed, they do not modify the existing facts, but add new facts. Logical inference rules add new facts in an irrevocable way, whereas default rules add new facts in a defeasible way, meaning that they are revoked if they contradict more reliable facts. As this difference concerns the action part, but not the condition part, (families 00 missing cases of logical business rules have the same form as those of the standard business rules and logical business rules may be categorized in the same way as production rules.

FIG. 1 shows a data-flow chart of a missing-case detector. The depicted missing-case detector comprises three major building blocks, namely a missing-case modeler 100, a missing-case solver 110, and a missing-case synthesizer 120. Missing-case modeler 100 constructs a rules inhibition graph 131 for a given rule project 132 and a given scope 133. Rules inhibition graph 131 describes the cases that make all the rules non-applicable. It is a directed acyclic graph representing a logical constraint model. Each node in the graph represents a distinct sub-expression of the constraint model and the single root node represents the whole constraint model. Graph edges link the nodes of the expressions with the nodes of their sub-expressions. Multiple edges will point to a sub-expression if it occurs multiple times in the constraint model. The missing-case detector uses a store of sub-expressions 134 in order to find already generated nodes when constructing the rules inhibition graph. Once the graph is constructed, missing-case solver 110 explores different ways to label the nodes with values while trying to find values that respect the operations represented by the graph and that labels the root node with "true". If such a consistent labeling exists, the solver will eventually find it assuming it does not exceed a time limit and produce a solved inhibition graph 135, which corresponds to a missing case. Otherwise, the solver either proves the unsatisfiability or stops its operation after exceeding a time limit. In the first case, missing-case synthesizer 120 generalizes the missing case into a family of similar missing cases. It combines the missing-case and its generalization into a missing-case description 136. Furthermore, it computes a missing-case nogood 137 (stored in a missing-case nogood store 138).

Figure 2:
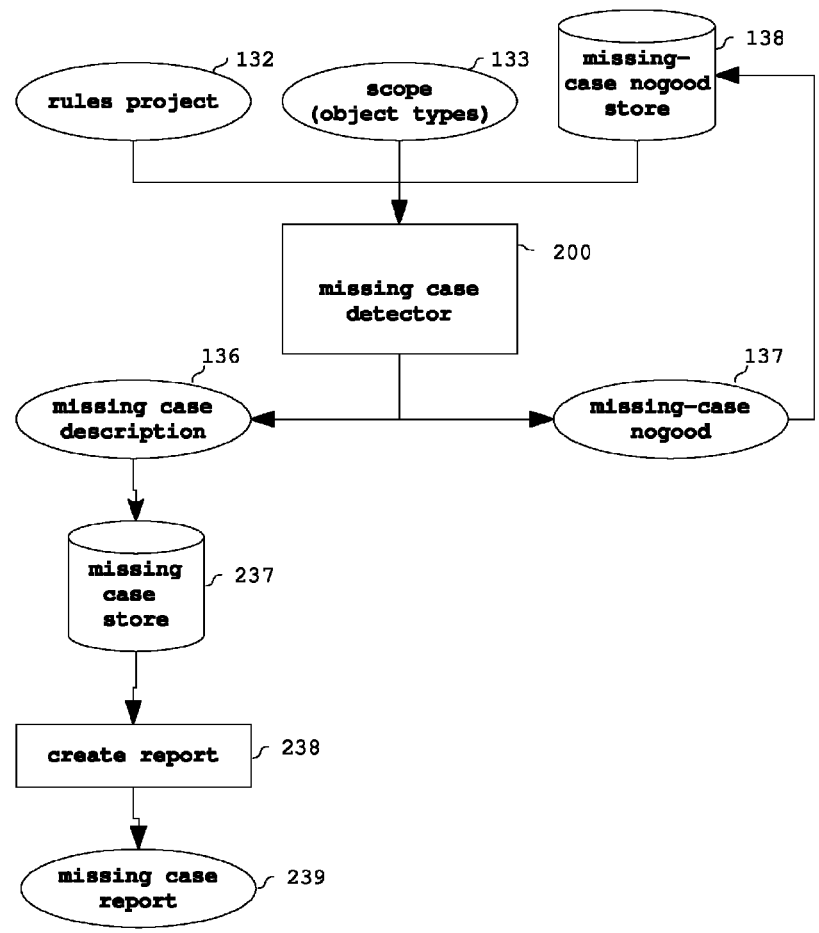
FIG. 2 illustrates a feed-back loop for iterative missing-case detection.

FIG. 2 illustrates a feed-back loop for iterative missing-case detection. Subsequent calls of missing-case detector 200 can take into account a missing-case nogood store 138 which contains the nogoods computed in previous calls. This feed-back loop ensures that subsequent graph labelings are different from the already detected missing cases and thus permits an iterative generation of the missing cases. The process stops when solver 110 no longer finds a further missing case. If solver 110 stopped normally without exceeding a time-out, this means that there is no case that makes the rules non-applicable and that is different than the previously-detected missing cases, which are eliminated by the nogoods. Missing case descriptions can be stored in a missing case store 237. With the data in the missing case store 237, a missing case report 239 can be created (238).

Figure 3:
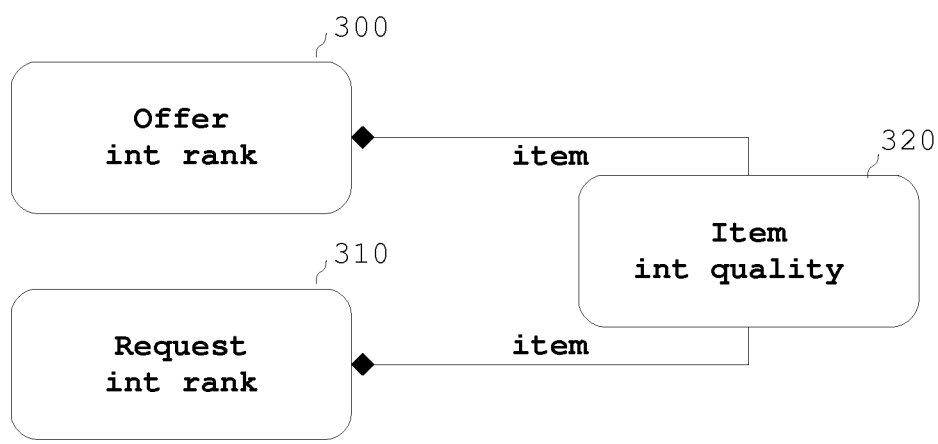
FIG. 3 provides an example for an object model.

FIG. 3 provides an example for an object model. A simple example helps to understand how the three principal components depicted herein are working in detail. A trading agency uses rules to determine interesting requests and offers for items among those that it receives via a web service. The rule project for this example contains an object model which consists of three classes "Offer" 300, "Request" 310, and "Item" 320. An instance of class "Item" has an attribute "quality" representing a quality index. The instances of the classes "Offer" and "Request" refer to their respective "Item" instances and have a rank attribute. The following rules (formulated in the BAL language of IBM WebSphere ILOG JRules 7.0) may be used to process requests and offers and determine their ranks:

These rules are used to process cases containing at least one instance of class "Offer" and one instance of class "Request".

When identifying missing cases; a user of missing-case detector 200 will therefore supply the rule project as well as a scope consisting of an instance of class "Offer" and an instance of class "Request".

Figure 4:
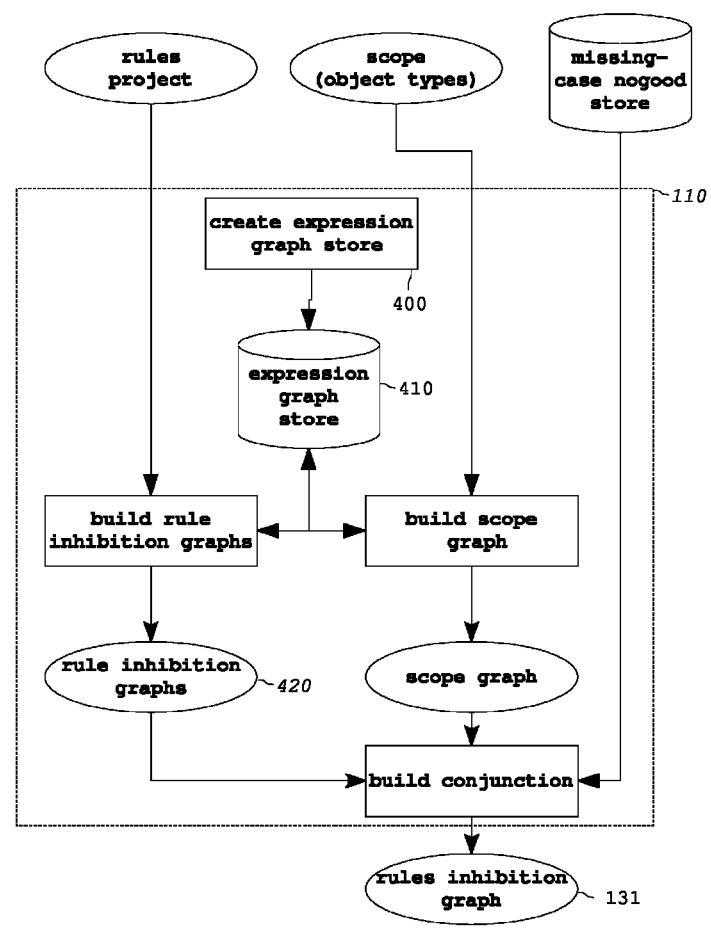
FIG. 4 shows a data-flow chart of the missing-case modeler.

FIG. 4 shows a data-flow chart of the missing-case modeler. Given the example described with respect to FIG. 3 and this input, the missing-case modeler builds a rules inhibition graph which describes the relevant missing cases in compact form.

Firstly, missing-case modeler 100 creates a global expression-graph store 400 and uses this store to store the nodes of all sub-expressions such as "the request", "6", "the item of the request", "the quality of the item of the request", "the quality of the item of the request is less than 6". Expression-graph store 410 is a building block of missing-case modeler 100 which ensures the uniqueness of representation for all those sub-expressions. Expression-graph store 410 either creates or retrieves a node representing an expression when it is supplied with the constituents of this expression and returns the created or retrieved node. A primitive expression like "6" or "the request" has a sole constituent, namely its name or symbol. The constituents of a composed expression such as "the quality of the item of the request" are a name or symbol representing the attribute "quality" and a node representing the sub-expression "the item of the request". Similarly, the constituents of a composed expression such as "the quality of the item of the request is less than 6" are the name or symbol representing the operator "is less than" and the nodes representing the sub-expressions "the quality of the item of the request" and "6".

In the described embodiment, missing-case modeler 100 generates an expression graph indicating which objects exist according to the given scope. The scope specifies a number of instances for each class. Missing-case modeler 100 creates unique names for these instances, for example by taking the class name "Request" and by appending a number starting with 1, thus resulting into the names "Request1" and "Offer1" for the scope of the example. Furthermore, missing-case modeler 100 declares that these instances exist (in the working memory) and have the appropriate type. For each class, it uses an internal unary predicate such as "is a request" or "is an offer" to declare that the objects in the scope have this type. The resulting scope expression graph represents the conjunction of these statements of type declarations like "Request1 is a request and Offer1 is an offer".

Thereafter, missing-case modeler 100 iterates over all rules in the rule project and builds a rule inhibition graph for each of them 420. The rule inhibition graph of a rule describes the cases which do not satisfy the condition of this rule. Missing-case modeler 100 combines inhibition graphs 420 into a rules inhibition graph 131.

Figure 5:
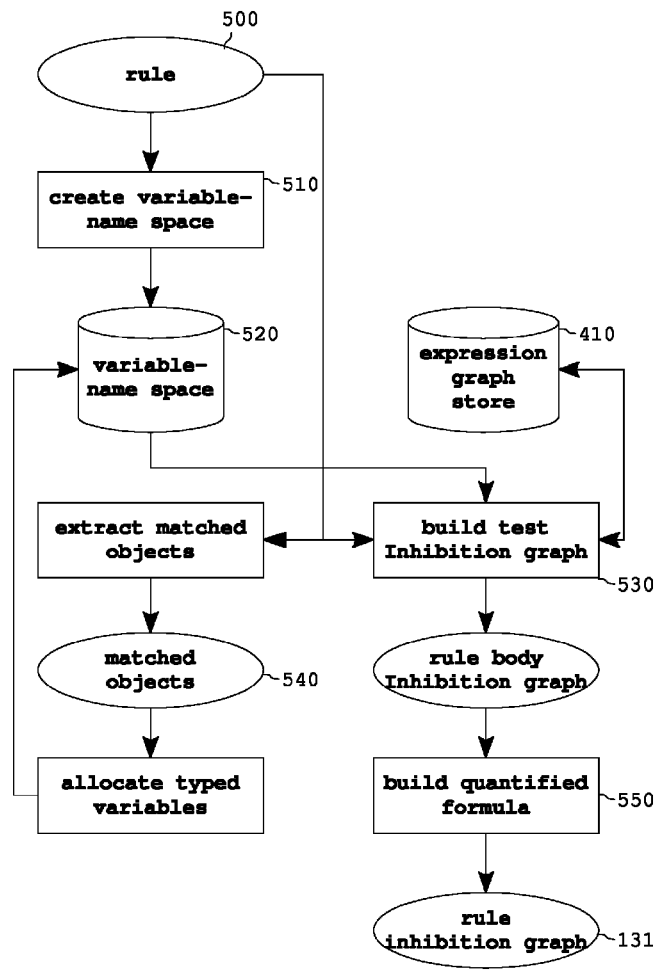
FIG. 5 shows a data-flow chart for building a rule inhibition graph.

FIG. 5 shows a data-flow chart for building a rule inhibition graph. Missing-case modeler 100 uses the same expression-graph store (e.g., expression-graph store 410) for all rules. As a consequence, the rule inhibition graphs of two different rules are sharing the nodes for sub-expressions that occur in both of these rules. When constructing a rule inhibition graph, missing-case modeler 100 introduces logical variables for the objects matched by the rules, then builds an inhibition graph for each test of the rule by using variables, and combines the inhibition graphs of the tests.

In order to create the described variables, the modeler first creates a variable-name space 510 local to each rule 500, then extracts the objects matched by the rule, and finally allocates a type-specific variable name for each of them within variable-name space 520. The variable name only depends on the type of the matched object and the number of times this type has already been requested within the local variable space. This naming policy guarantees a uniformity of the variable names of different rules. For example, the modeler will allocate the objects "the request" matched by rule1 and the object "y" matched by rule3 to the same variable name, e.g. "?request1". Similarly, it will allocate the object "the offer" matched by rule2 and the object "x" matched by rule3 to the same variable name, e.g. "?offer1". The uniform variable naming increases the number of nodes shared by different rule inhibition graphs. For example, the modeler maps the sub-expressions "the quality of the item of the request" and "the quality of the item of y" to the node "the quality of the item of ?request1" and ensures that this node is shared by the inhibition graphs of the rules "rule1" and "rule3".

Missing-case modeler 100 builds an inhibition graph 530 for each of the tests of a rule by traversing a tree-representation of the test in a depth-first way. When visiting an expression occurring in the test, it first allocates nodes for the sub-expressions of this expression. Then it asks the expression graph store to retrieve or create a node representing the expression by supplying the nodes for sub-expressions and the operator or attribute or method of the expression. When visiting a matched object 540, the modeler first replaces it by its variable name allocated 550 in the variable-name space 520 before creating or retrieving a node for it. Moreover, the modeler first replaces all predicates by negations of these predicates before creating or retrieving a node for a test. For example, it replaces the predicate "less than" by "greater than" and vice versa. Modeler 100 handles Boolean operations in a similar way replacing a conjunction by a disjunction and vice versa. It also replaces the negation of a test by the test itself. Otherwise, if the predicate of a test does not have a negated form, the modeler explicitly creates a node for the negation of the test. The negated tests then describe different possibilities to inhibit a rule. The rule is applicable if it matches a configuration of objects in the working memory that complies with the types of the matched objects and that satisfies each test. Conversely, the rule is inhibited if each configuration of objects within the working memory that complies with the types of the matched objects satisfies one of the negated tests. The inhibition graph of a rule therefore represents a universally quantified 550 disjunction of the negated tests. Missing-case modeler 100 adds additional disjuncts for checking the type compliance of the logical variables. For example, a test like the quality of the item of ?request1 is greater than the quality of the item of ?offer1" is only relevant if the variable "?request1" denotes an object of type "Request" in the working memory and the variable "?offer1" denotes an object of type "Offer" in the working memory. For this purpose, the modeler adds the disjuncts "?request1 is not a request" and "?offer1 is not an offer".

Figure 6:
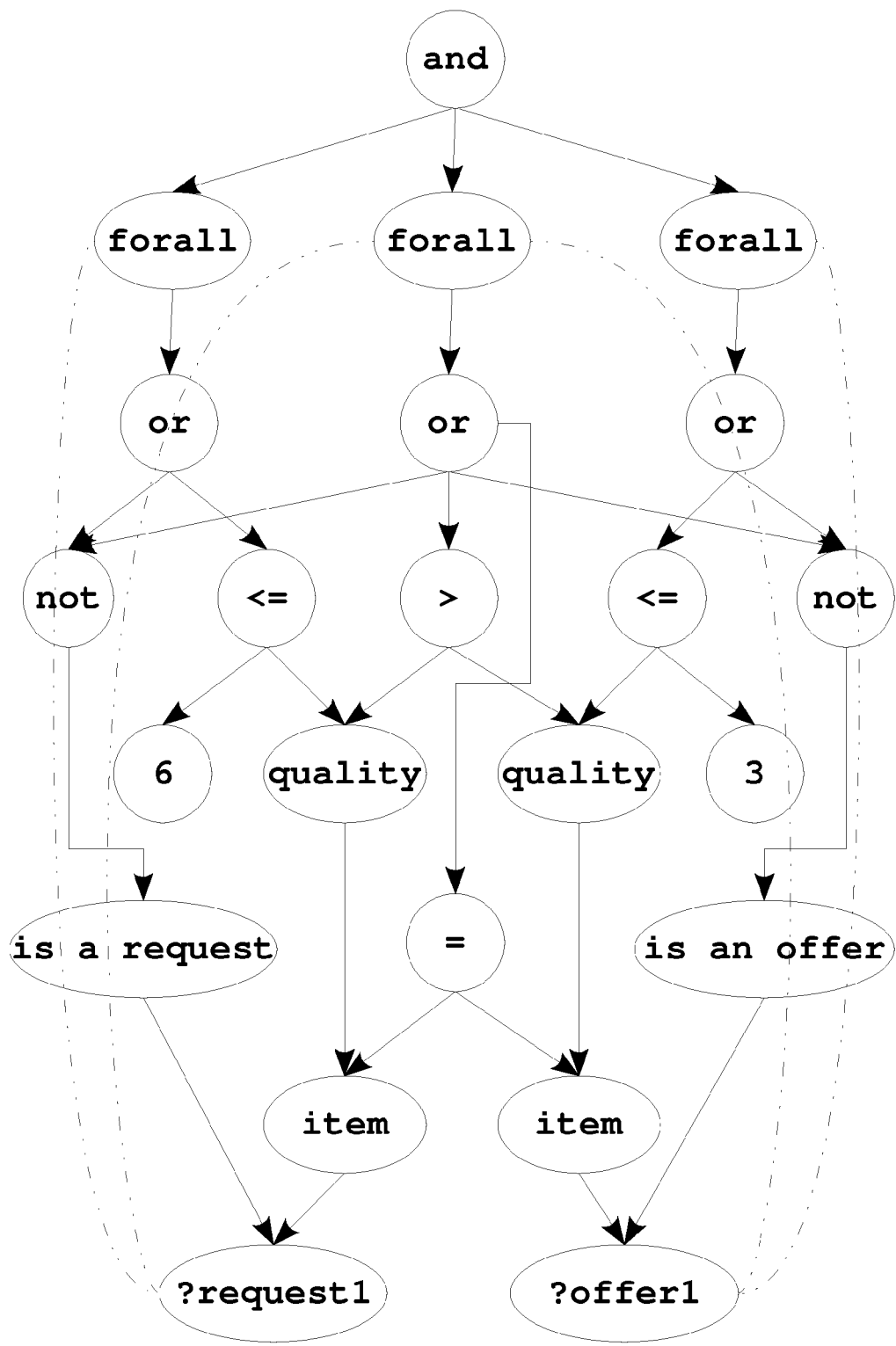
FIG. 6 shows a rules inhibition graph (without its scope graph)

FIG. 6 shows a rules inhibition graph (without its scope graph). Once missing-case modeler 100 has built the rule inhibition graphs of all rules 420, it constructs a rules inhibition graph 131. If rule project 132 has no rule flow, then the rules inhibition graph represents the conjunction of the individual rule inhibition graphs and of the scope graph constructed before. The rules inhibition graph (without its scope graph) for the rule project 1 has 22 nodes in FIG. 6. If rule project 132 has a rule flow, then this rule flow consists of several rule tasks representing different steps of the decision-making process. A rule task contains a subset of the business rules and may have specific missing cases occurring among those rules. Missing-case modeler 100 is able to perform a task-wise missing case detection by building a rules inhibition graph for each task. It constructs this task inhibition graph 131 as described before by combining the rule inhibition graphs of all the rules that belong to the rule task. As only one rule task is executed at a time, the missing-case modeler builds an overall rules inhibition graph which represents a disjunction of the different task inhibition graphs.

Figure 7:
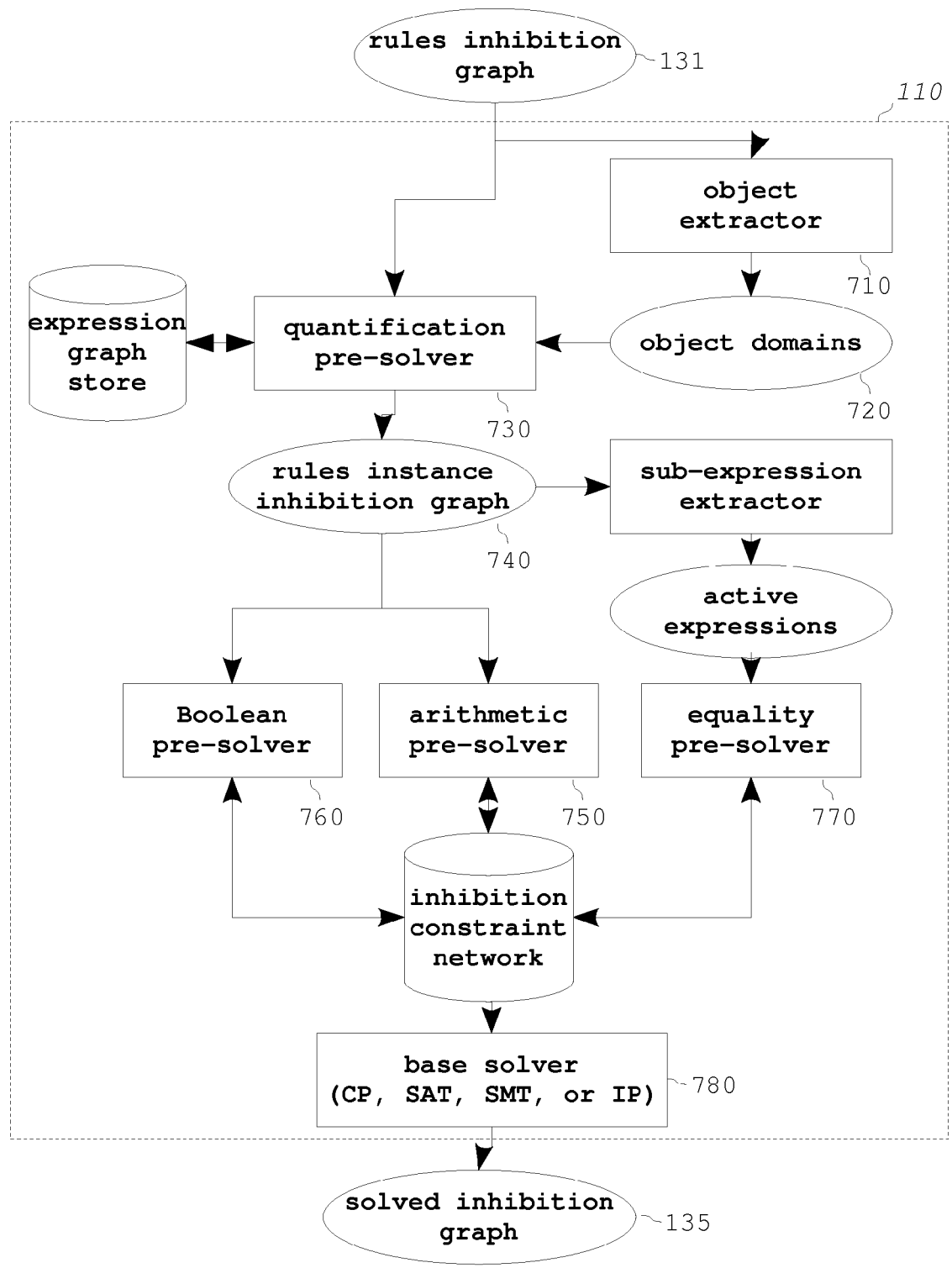
FIG. 7 shows a data-flow chart of a missing case solver.

FIG. 7 shows a data-flow chart of the missing-case solver. Missing-case solver 110 uses satisfiability techniques and constraint solving techniques to determine a solved inhibition graph 135 or to prove that no such solved graph exists. Constraint solving techniques may be search and inference procedures as described in *Handbook of Constraint Programming*, Elsevier, *ISBN*-13: 978-0-444-52726-4.

These constraint solving techniques or search and inference procedures include for example: deriving basic forms of constraints such as quantifier-free constraints, propagating arithmetic intervals, propagating Boolean truth values, propagating equality, deriving bounds from linear relaxations, chronological backtracking, dependency-directed backtracking and clause learning. Other techniques may be used in alternative embodiments of the present invention.

Rules inhibition graph 131 represents a first-order logic formula which contains equality and arithmetic operators and which consists of a description of the scope and a description of how to make all rule non-applicable. In order to determine a solved inhibition graph 135, the missing-case solver first extracts 710 the potentially existing objects from the scope description and includes them into an object domain 720. A pre-solver 730 for universally quantified formulas then uses this object domain to instantiate each universally quantified formula and to replace it by the conjunction of its instances within the rules inhibition graph. A rules instance inhibition graph 740 is obtained.

In various invention embodiments, missing-case solver 110 uses different pre-solvers to create variables and constraints for a base constraint solver. The base solver may be a SAT solver, an SMT solver, a Constraint Programming solver, or an Integer Programming solver. Most existing solvers are not able to solve the constraints expressed by a rules instance inhibition graph directly and in the described embodiments pre-solvers which create the relevant constraints and variables are relied upon. An arithmetic pre-solver 750 creates integer variables and constraints for nodes with arithmetic operations while a Boolean pre-solver 760 creates Boolean variables and constraints for disjunctions, conjunctions, and negations. For example, arithmetic pre-solver 750 will create two integer variables "x1" and "x2" for the values of the quality attributes of the items of "Request1" and "Offer1" and a greater-than constraint "x1>x2" as well as a Boolean variable representing the truth value of this constraint. Boolean pre-solver 760 sets the value of the Boolean variable representing the truth value of the root node of the rules instance inhibition graph to "true", but leaves the other variables unconstrained.

The equality pre-solver creates the relevant instances of the axioms of equality theory (reflexivity, symmetry, transitivity, and functionality) for all sub-expressions occurring in the rules instance inhibition graph and links them with existing equality constraints. For example, it creates a Boolean variable "e1" that is true if and only if the item of "Request1" is equal to the item of "Offer1" and a Boolean variable "e2" that is true if and only if the quality of the item of "Request1" is equal to the quality of the item of "Offer1". As the quality attribute has an integer value, equality solver 770 also creates an equality constraint "x1=x2" and links its truth value with the equality variable e2. Equality pre-solver 770 then adds an implication "not e1 or e2" to the base solver, which encodes the functionality axiom for the quality attribute. Missing-case solver 110 may pursue different control strategies to create the relevant variables and constraints. It may either do a full creation before invoking base solver 780 or interleave constraint generation and solving. It passes the generated constraints and variables to base solver 780 and requests a value for each variable such that all constraints are respected. If base solver 780 does not find a solution within a given time-limit, then missing-case solver 110 signals this as its result. If base solver 780 finds such a solution, missing-case solver 110 labels rules instance graph 740 with them and either continues constraint generation based on the intermediate results or returns the labeled graph. Base solver 780 directly determines the values of integer variables such as "x1" and "x2" and missing-case solver 110 just copies these values to the corresponding graph nodes. Similarly, base solver 780 determines the values of Boolean variables and missing-case solver 110 copies them to their graph nodes. Missing-case solver 110 labels the remaining nodes by processing the equality variables that have got the value "true". If it has created such an equality variable for two object-valued nodes "n1" and "n2" then these two nodes are equivalent. Missing-case solver 110 uses the union-find algorithm to process these equivalences and to construct the equivalence classes. For example, it may label nodes "n1" and "n2" by a node "n3" and label "n3" by a node "n4". This means that all these four nodes represent the same object.

Figure 8:
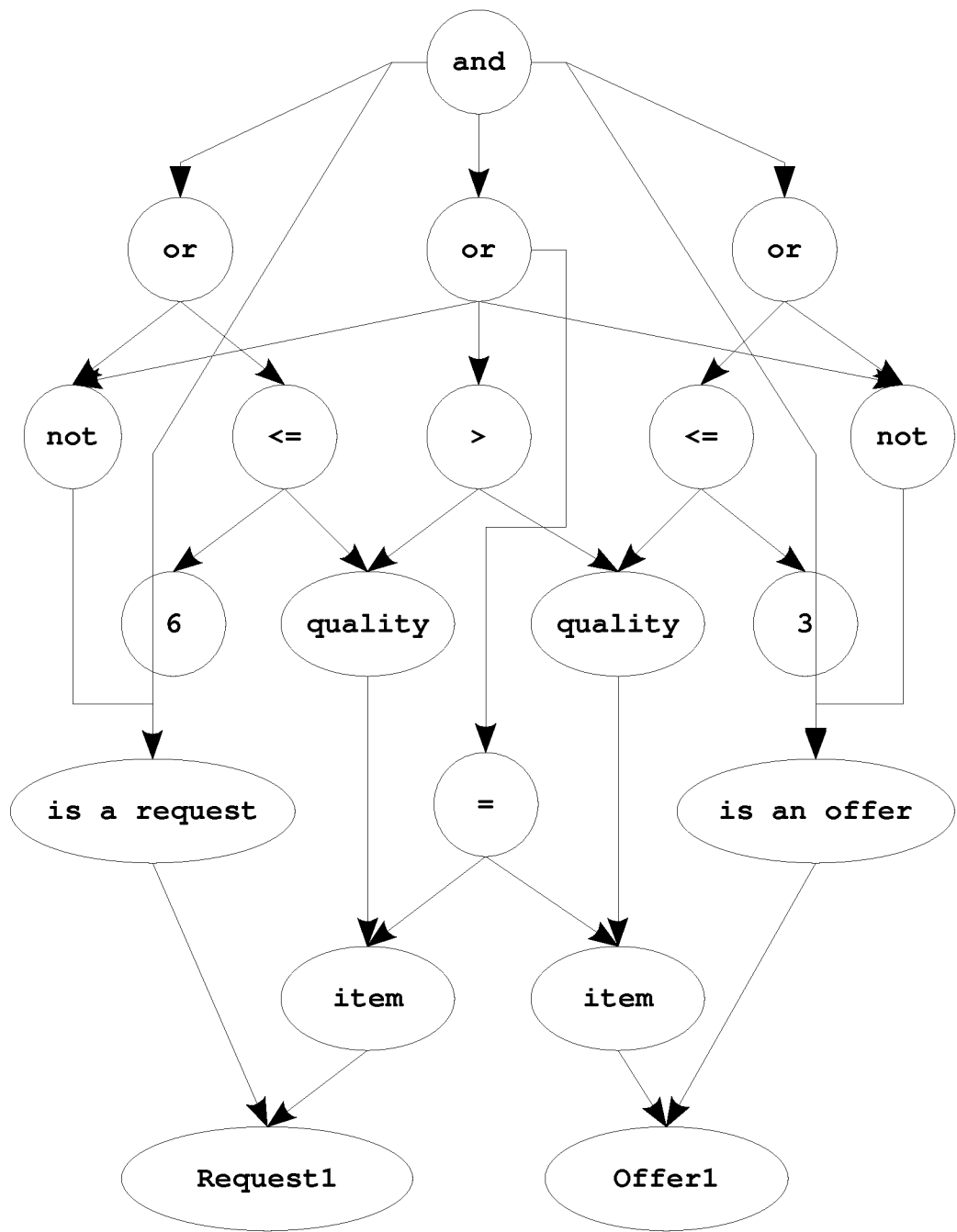
FIG. 8 shows a rules instance inhibition graph.

FIG. 8 shows a rules instance inhibition graph, depicting an example of a rules instance inhibition graph such as rules instance inhibition graph 740. The resulting rules instance inhibition graph no longer contains any quantification.

Figure 9:
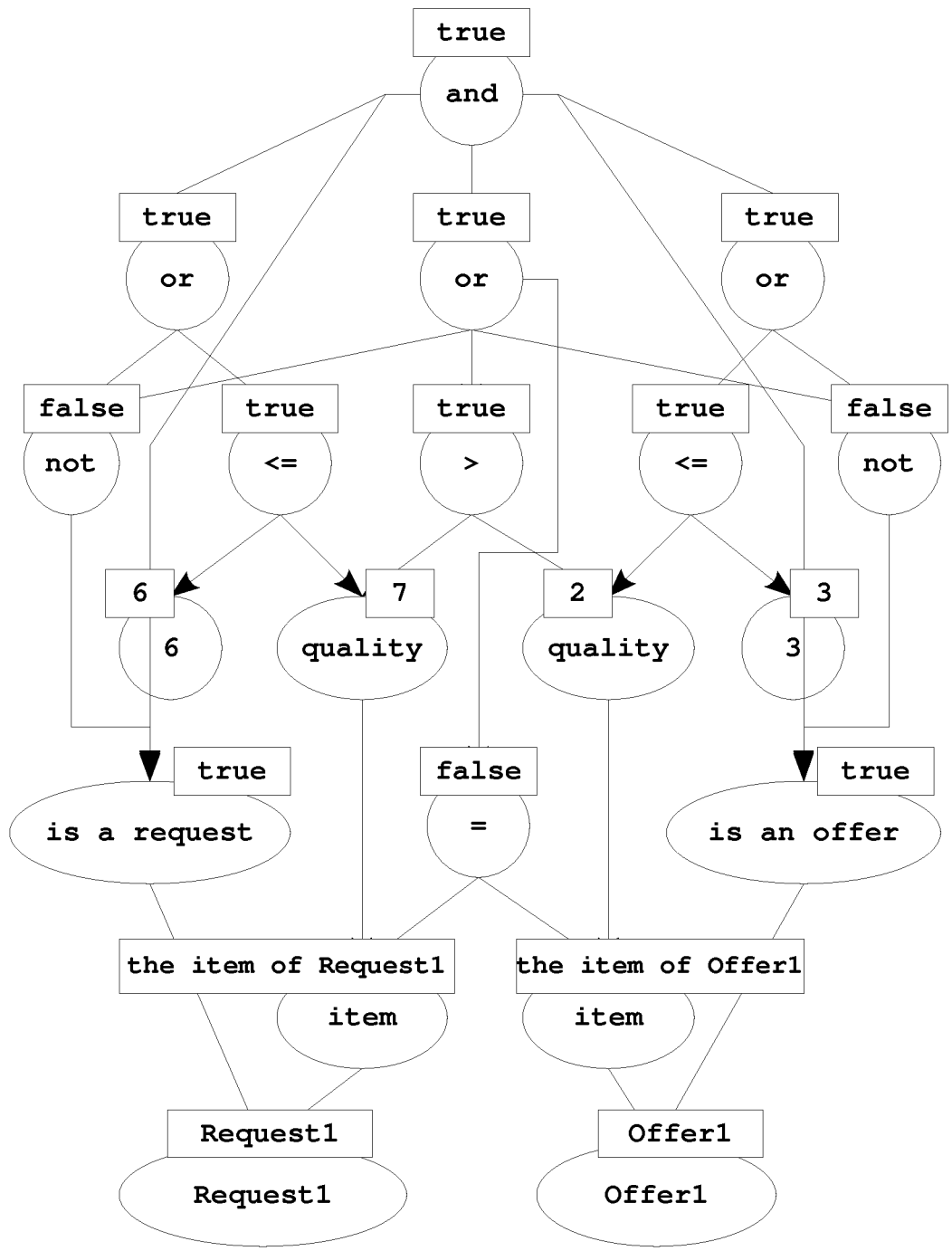
FIG. 9 shows a solved inhibition graph for a rule project 1.

FIG. 9 shows a solved inhibition graph for rule project 1. In the illustrated embodiment, missing-case solver 110 labels the nodes of rules instance inhibition graph 740 by values that respect the operations represented by the nodes as illustrated in FIG. 9. This solved inhibition graph 135 describes the objects of a missing case as well as the attribute values of those objects. Solved inhibition graph 135 in FIG. 9 labels each object-valued node with a different object. Equality constraints may require that different nodes are labeled with the same object.

Figure 10:
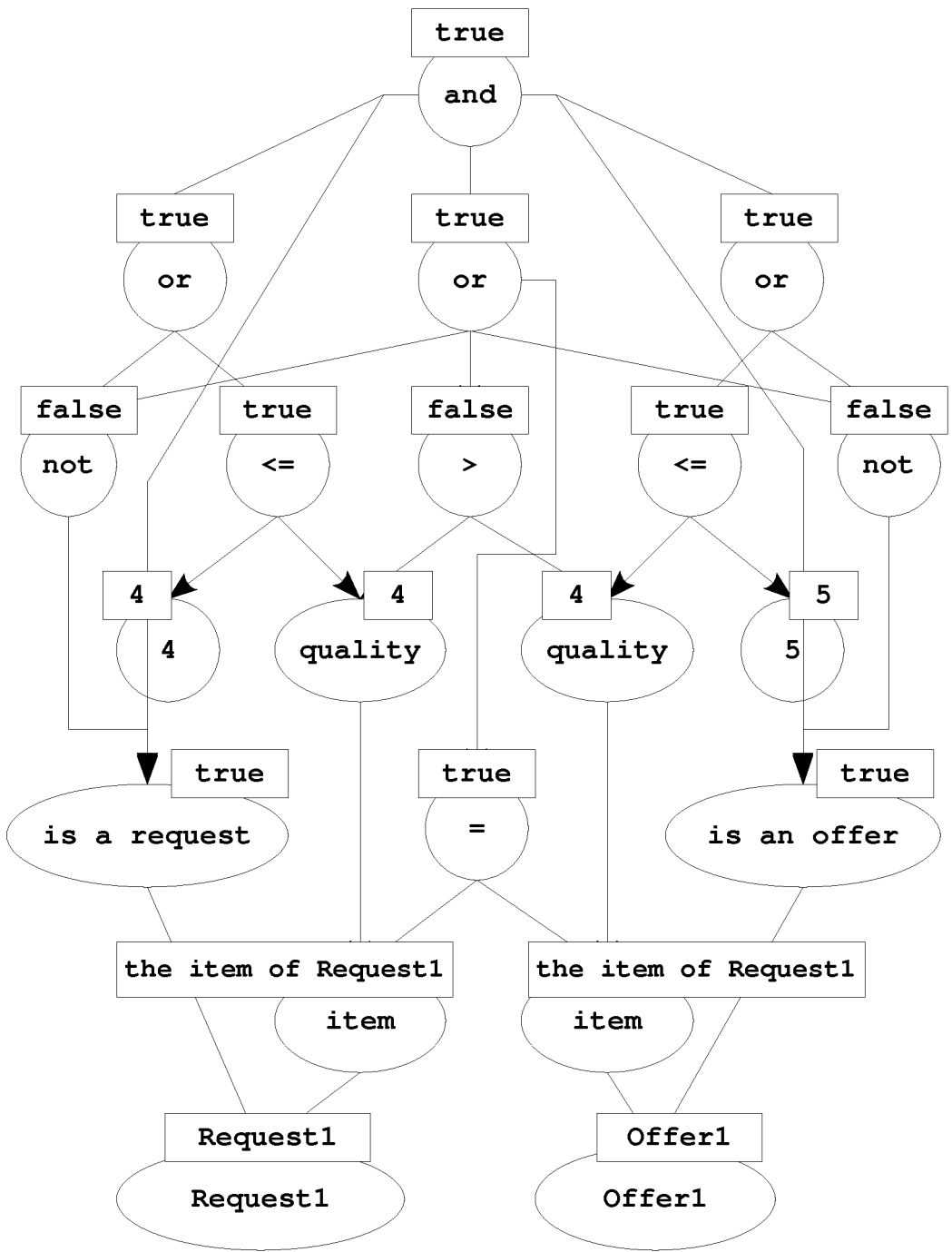
FIG. 10 shows a solved inhibition graph for a rule project 2.
Figure 11:
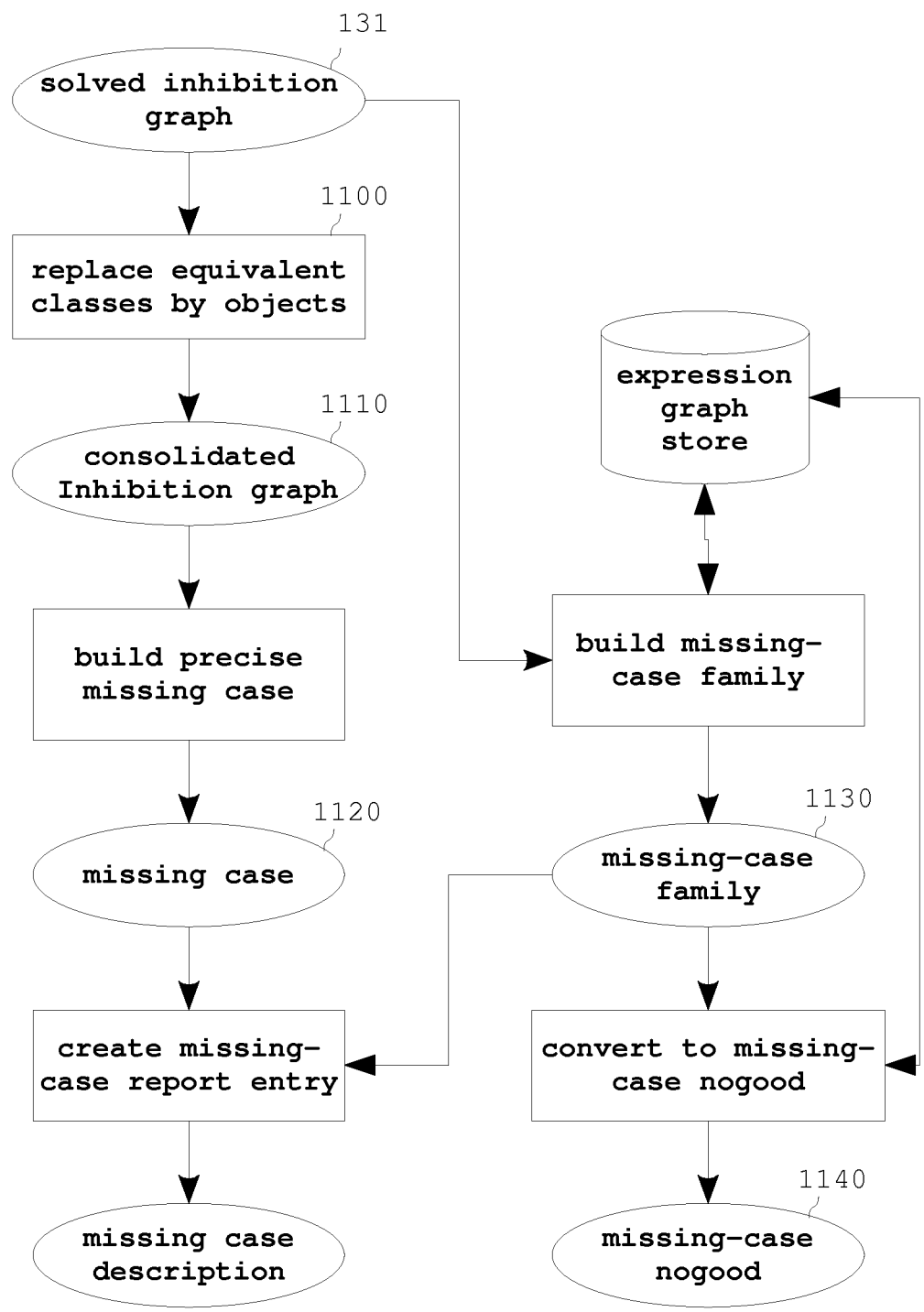
FIG. 11 shows a data-flow chart of a missing-case synthesizer.

FIG. 10 shows a solved inhibition graph for rule project 2. The illustrated variant of rule project 1 has a solved inhibition graph which labels the nodes "item of Request1" and "item of Offer1" by the same objects:

FIG. 11 shows a data-flow chart of missing-case synthesizer. Missing-case synthesizer 120 transforms a solved inhibition graph 135 into a consolidated inhibition graph 1110 by labeling all nodes within an equivalence class with a distinct object (1100). Missing-case synthesizer 120 then converts consolidated solved inhibition graph 1110 into a missing-case description which includes the selected object of each equivalence class. Missing-case synthesizer 120 extracts the attribute values of those objects by examining the attribute nodes in consolidated inhibition graph 1110. According to one example as illustrated, the node for the attribute quality of the item of "Request1" has the label "4" and its child node has the label "Item1". The missing-case synthesizer produces an object-attribute-value triple describing this relationship.

Additionally, the missing-case synthesizer generalizes missing case 1120 into a family of similar missing cases 1130. To determine such a family, the missing-case synthesizer does not use the values of the attribute nodes within the solved inhibition graph, but the truth values of the constraint nodes. The constraint nodes are those nodes that represent an atomic formula, i.e. constraints such as "the quality of the item of Request1 is greater than 4" or "the item of Request1 is equal to the item of Offer1", but not a disjunction, conjunction, negation, or universal quantification of constraints. If the constraint has the value "true", then the missing-case synthesizer selects the constraint for the missing-case family description. Otherwise, the constraint has the value "false" and the missing-case synthesizer negates the constraint either by replacing the predicate of the constraint by the negated predicate or by creating a new node representing the negation of the constraint. Missing-case synthesizer 120 selects this negation for a description of missing-case family 1130.

Missing-case synthesizer 120 then builds a missing-case family graph 1130 that represents the conjunction of all the selected literals. The previously detected missing-case satisfies this conjunction. Moreover, each labeling of the nodes of missing-case family 1130 graph that respects the operations represented by the nodes and that labels the root node "true" is a missing case. For example, a new missing case may be obtained according to the described embodiment from the missing case depicted in FIG. 10 by changing the values of the quality nodes from 4 to 5. This change does not affect the labeling of the constraint nodes and the new labeling satisfies the constraint expressed by the missing-case family graph. This demonstrates that a missing-case family graph represents a family of similar missing cases. Furthermore, missing-case synthesizer 120 converts missing-case family 1130 to a missing-case nogood 1140 by negating the whole graph.

Figure 12:
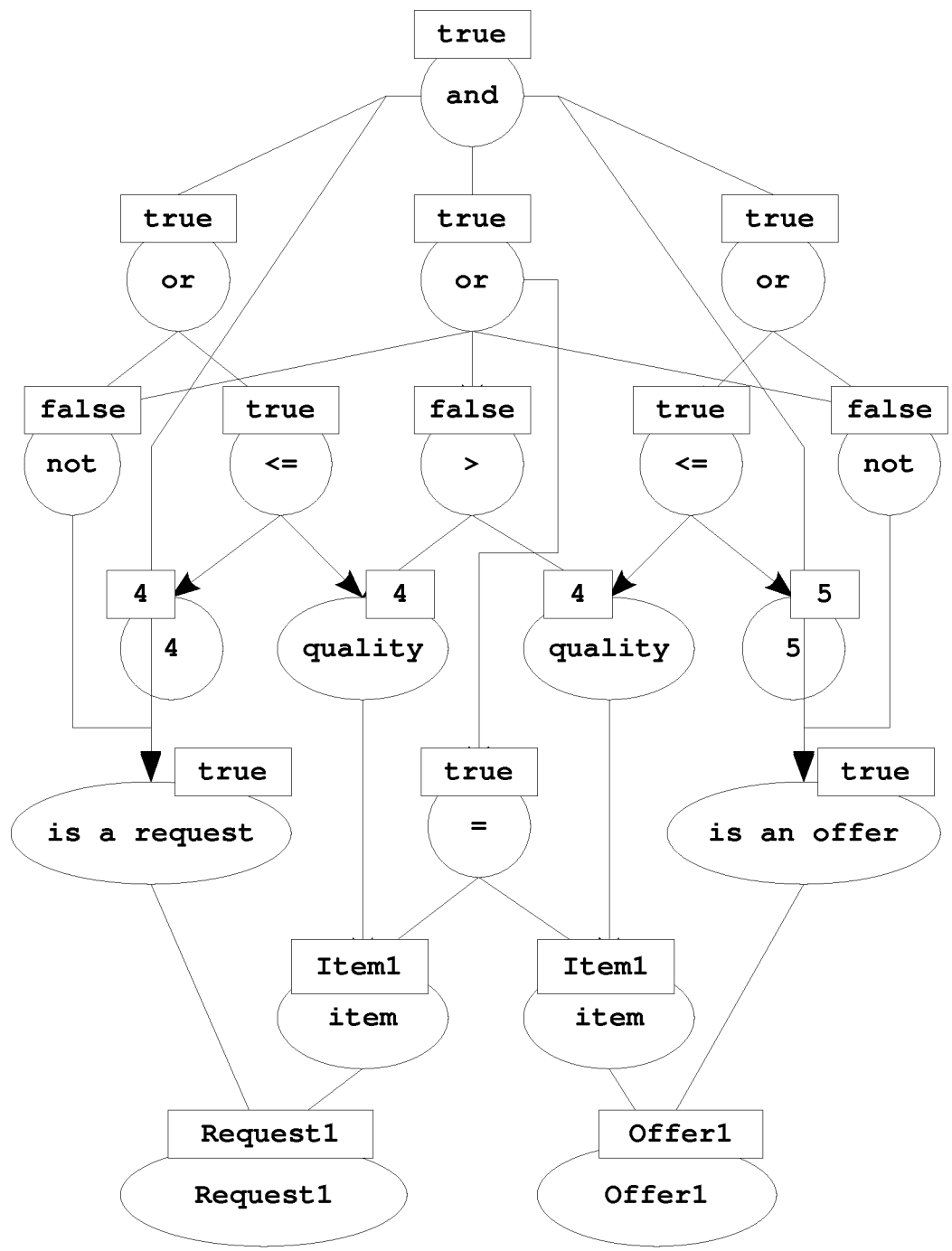
FIG. 12 shows a consolidated inhibition graph for rule project 2.

FIG. 12 shows a consolidated inhibition graph (1110) for rule project 2.

Figure 13:
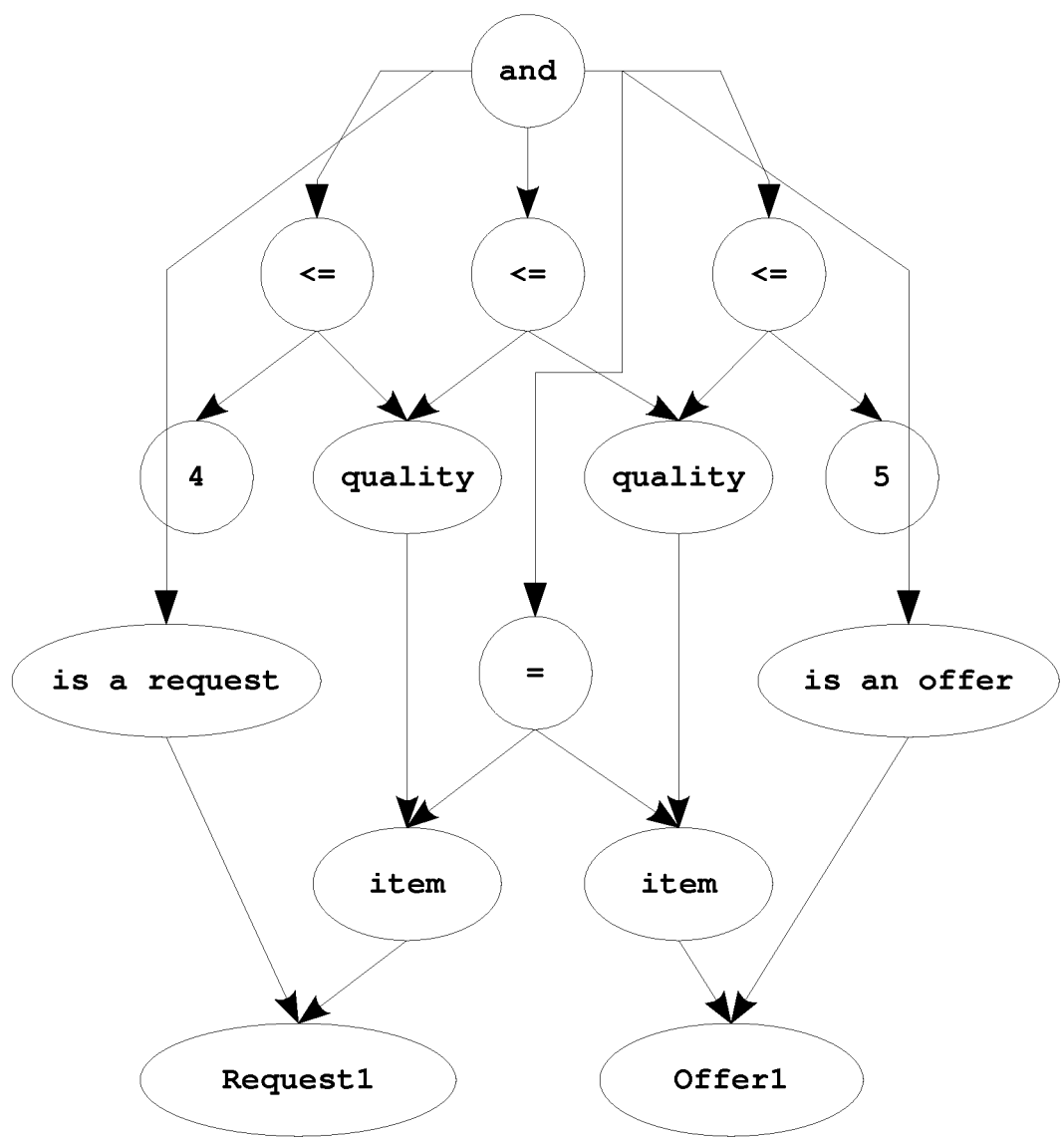
FIG. 13 shows a missing-case family for rule project 2.

FIG. 13 shows a missing-case family (1130) for rule project 2.

Figure 14:
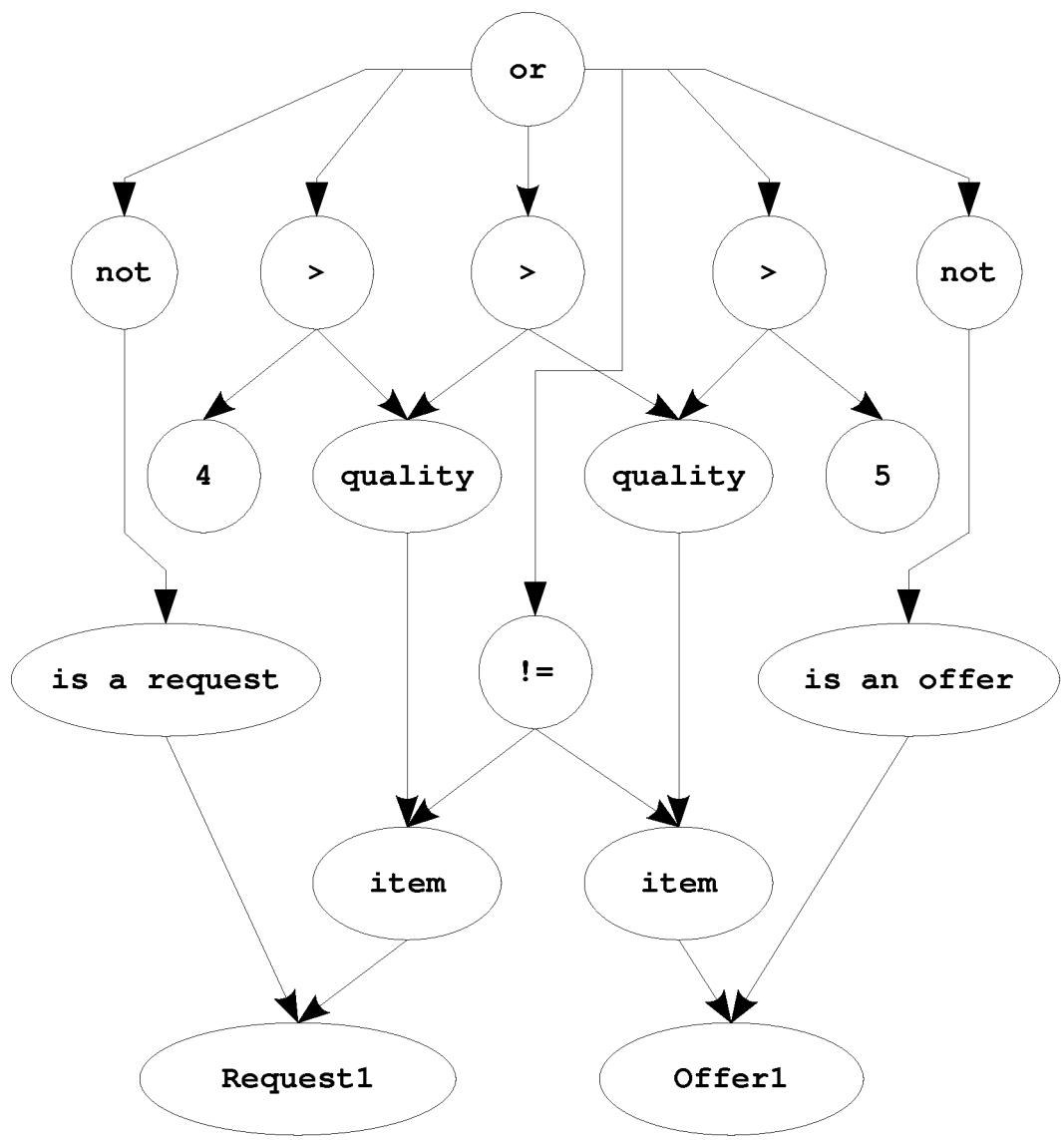
FIG. 14 shows a missing-case nogood N1 for rule project 2.

FIG. 14 shows a missing-case nogood N1 for rule project 2. FIG. 14 depicts a missing-case nogood graph. If missing-case detector 200 receives feed-back about previously computed missing-case nogoods then it will include these nogoods in the illustrated rules inhibition graph. Missing-case solver 120 will then generate constraints for those missing-case nogoods 1140 and add them to base solver 780. Thus, missing-case solver 120 will find missing cases which do not belong to the already detected missing-case families.

Figure 15:
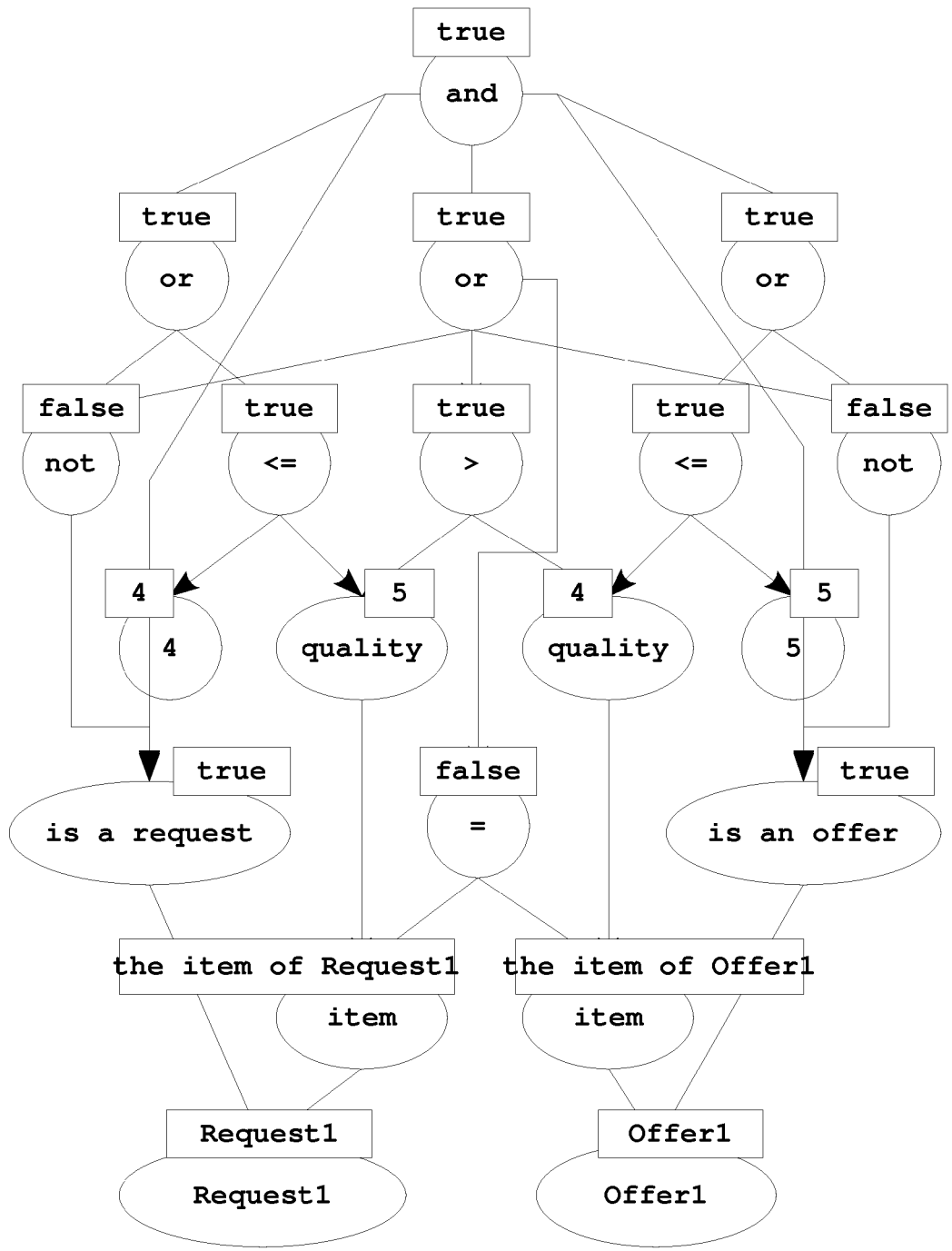
FIG. 15 shows a solved inhibition graph for rule project 2 and nogood N1.

FIG. 15 shows a solved inhibition graph for rule project 2 and nogood N1. Whereas rule project 1 has only a single missing-case family, missing-case detector 200 will find a second missing-case family for rule project 2 (as shown in FIG. 15) which satisfies the rules inhibition graph of this project as well as the previously computed missing-case nogood. If missing-case detector 200 does not find a (further) missing case, it signals this to its invoking service which can then generate a complete report assuming it has registered previously generated missing-case descriptions in an adequate store (see FIG. 2). An option according to one embodiment of the present invention is to generate the missing cases one by one or in packets of a given size.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. In particular it will be appreciated that the functionality of many of the components of disclosed figures may be implemented by means of software, hardware or firmware of any combination of these. In a high performance system a hardware implementation may prove advantageous for example.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the user's computer, as a stand-alone software package, partly on the users computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer program product for detecting a missing case of a fixed scope among a plurality of business rules of unrestricted forms, the computer program product comprising:
    a non-transitory computer readable medium having program instructions stored therein, the program instructions to,
    build a rule inhibition graph for each of the plurality of business rules, wherein each rule inhibition graph describes one or more cases that do not satisfy a condition of the rule;
    build a rules inhibition graph based on the rule inhibition graphs that were built for the plurality of business rules, said rules inhibition graph representing a constraint model comprising a plurality of nodes and describing a plurality of cases which make the plurality of business rules non-applicable;
    label the rules inhibition graph with values satisfying constraints of said constraint model utilizing search and inference procedures;
    determine a missing case when a consistent labeling satisfying the constraints of said constraints model is obtained pursuant to labeling of the rules inhibition graph, wherein the missing case is a case that does not satisfy a condition of any of the plurality of business rules.

2. A business rule management system for detecting a missing case of a fixed scope among a plurality of business rules of unrestricted forms, the business rule management system comprising:
    a processor;
    a communication bus coupled to said processor; and
    a memory coupled to said communication bus having stored therein one or more instructions which, when executed by said processor, cause the business rule management system to perform operations comprising:
    building a rule inhibition graph for each of the plurality of business rules, wherein each rule inhibition graph describes one or more cases that do not satisfy a condition of the rule;
    building a rules inhibition graph based on the rule inhibition graphs that were built for the plurality of business rules, said rules inhibition graph representing a constraint model comprising a plurality of nodes and describing a plurality of cases which make the plurality of business rules non-applicable;
    labeling the rules inhibition graph with values satisfying constraints of said constraint model utilizing search and inference procedures;
    determining a missing case when a consistent labeling satisfying the constraints of said constraints model is obtained pursuant to said labeling the rules inhibition graph, wherein the missing case is a case that does not satisfy a condition of any of the plurality of business rules.

* * * * *